United States Patent
Huang et al.

(10) Patent No.: US 7,291,813 B1
(45) Date of Patent: Nov. 6, 2007

(54) CONTROLLER FOR ELECTRIC ARTICLE FOR HUMAN BODY

(76) Inventors: Ching-Lin Huang, No. 23, Guangyu N. St., Yangmei Town, Taoyuan County (TW) 32666; Chin-Ta Ko, 1F., No. 43, Alley 36, Lane 250, Sec. 5, Nanjing E. Rd., Taipei (TW) 10564

( * ) Notice: Subject to any disclaimer, the term of this patent is extended or adjusted under 35 U.S.C. 154(b) by 0 days.

(21) Appl. No.: 11/504,790

(22) Filed: Aug. 14, 2006

(51) Int. Cl.
    *H05B 1/02* (2006.01)
(52) U.S. Cl. ............... 219/490; 219/497; 219/481; 219/505; 374/163; 323/293
(58) Field of Classification Search ........... 219/490, 219/494, 492, 505, 497, 501, 507–510, 483–486, 219/481; 307/117; 374/163, 172; 323/369, 323/293
See application file for complete search history.

(56) References Cited

U.S. PATENT DOCUMENTS

| | | | | |
|---|---|---|---|---|
| 5,111,026 A | * | 5/1992 | Ma | 219/492 |
| 5,373,141 A | * | 12/1994 | Ko | 219/497 |
| 5,611,952 A | * | 3/1997 | Jones | 219/505 |
| 6,009,369 A | * | 12/1999 | Boisvert et al. | 701/99 |
| 6,191,556 B1 | * | 2/2001 | Galbraith et al. | 320/132 |

* cited by examiner

*Primary Examiner*—Mark Paschall
(74) *Attorney, Agent, or Firm*—Alan Kamrath; Kamrath & Associates P.A.

(57) ABSTRACT

A controller for an electric article includes a voltage-stabilizing circuit for supplying voltage stable DC power, a microprocessor, a temperature-detecting circuit, a protecting circuit, a control circuit, and a switch circuit. The temperature-detecting circuit includes several comparators commonly connected to a temperature range switch. The protecting circuit includes a comparator that detects a pre-set highest heating temperature and that is connected to the voltage stable DC power and a voltage-detecting circuit of the voltage stable DC power. The comparator of the protecting circuit is further connected to a voltage-dividing end of a thermistor connected to a temperature-detecting wire. The control circuit is connected to the microprocessor and an output of the comparator of the protecting circuit. The switch circuit is connected to an output of the voltage stable DC power and the control circuit, thereby controlling conduction or cutting off DC power supply to the electric article.

6 Claims, 3 Drawing Sheets

CONTROLLER FOR ELECTRIC ARTICLE FOR HUMAN BODY

BACKGROUND OF THE INVENTION

1. Field of the Invention

The present invention relates to a controller for an electric article. More particularly, the present invention relates to a controller for an electric article for human body, such as electric clothing, an electric blanket, an electric band for medical treatment or healthy maintenance, etc.

2. Description of the Related Art

Electric article for human body include electric clothing, electric blankets, electric bands for medical treatment or healthy maintenance, etc. An electric article can be heated by electricity to increase the temperature for keeping warm. Typically, an electrically conductive heat-generating member such as a thermally and electrically conductive carbon fiber is mounted in such an electric article and connected to a power supply controller. Electricity is converted into heat energy. A temperature-detecting circuit and a temperature-detecting wire are provided to monitor the temperature for controlling conduction and for determining on/off of the power.

The temperature-detecting circuit detects the heating temperature and changes the RC time constant of an oscillating circuit for switching conduction of the circuit or turning the power off. However, such a temperature detecting measure cannot rapidly and precisely detect the temperature, which adversely affects stability of the set temperature range and wastes electricity. Further, there is no protecting circuit in the controller for double protection. Abnormal heating occurs easily, leading to high risk to properties and lives.

SUMMARY OF THE INVENTION

In accordance with the present invention, a controller for an electric article for human body controls DC power supply to an electrically conductive heat-generating member in the electric article and is connected to a temperature-detecting wire of the electric article. The controller comprises a voltage-stabilizing circuit for supplying voltage stable DC power, a microprocessor, a temperature-detecting circuit, a protecting circuit, a control circuit, and a switch circuit.

The temperature-detecting circuit includes a plurality of first comparators for detecting a plurality of temperature ranges. Each first comparator includes a positive input connected to an associated one of a plurality of first voltage-dividing circuits of the voltage stable DC power. Each first comparator further includes a negative input connected to a voltage-dividing end of a thermistor that is connected to the temperature-detecting wire. The first comparators are commonly connected to a temperature range switch.

The protecting circuit includes a second comparator for detecting a pre-set highest heating temperature. The second comparator is connected to the voltage stable DC power and a second voltage-detecting circuit of the voltage stable DC power. The second comparator is further connected to the voltage-dividing end of the thermistor. The control circuit is connected to the microprocessor and an output of the second comparator of the protecting circuit. The switch circuit is connected to an output of the voltage stable DC power and the control circuit, thereby controlling conduction or cutting off DC power supply to the electric article.

Preferably, the microprocessor includes software cooperating with a clock pulse oscillating circuit to provide a countdown for abnormal heating for cutting off DC power supply via the control circuit and the switch circuit.

Preferably, the microprocessor includes software cooperating with a clock pulse oscillating circuit to set a period of time before carrying out repeated heating for a lowest temperature range after cutting off the DC power.

Preferably, the microprocessor further includes a plurality of indicator lamps connected to and controlled by the temperature range switch and the first comparators.

Preferably, the microprocessor further includes a buzzer that beeps when temperature range is switched or abnormal heating occurs.

Preferably, the control circuit includes two transistors connected in series. The transistors are respectively connected to the output of the microprocessor and the output of the second comparator of the protecting circuit.

Preferably, the switch circuit includes a metal-oxide-semiconductor field-effect transistor having a gate. A third voltage-dividing circuit is located between the gate of the metal-oxide-semiconductor field-effect transistor and the control circuit.

The controller in accordance with the present invention is capable of precisely detecting the heating temperature, maintaining the heating temperature range with automatic control, and saving electricity, which is suitable for DC voltage output to voltage-drop-free control while providing a double protection design and enhanced operating safety to avoid risk of abnormal heating.

Other objectives, advantages, and features of the invention will become more apparent from the following detailed description when taken in conjunction with the accompanying drawings.

DETAILED DESCRIPTION OF THE PREFERRED EMBODIMENT

Figure 1:
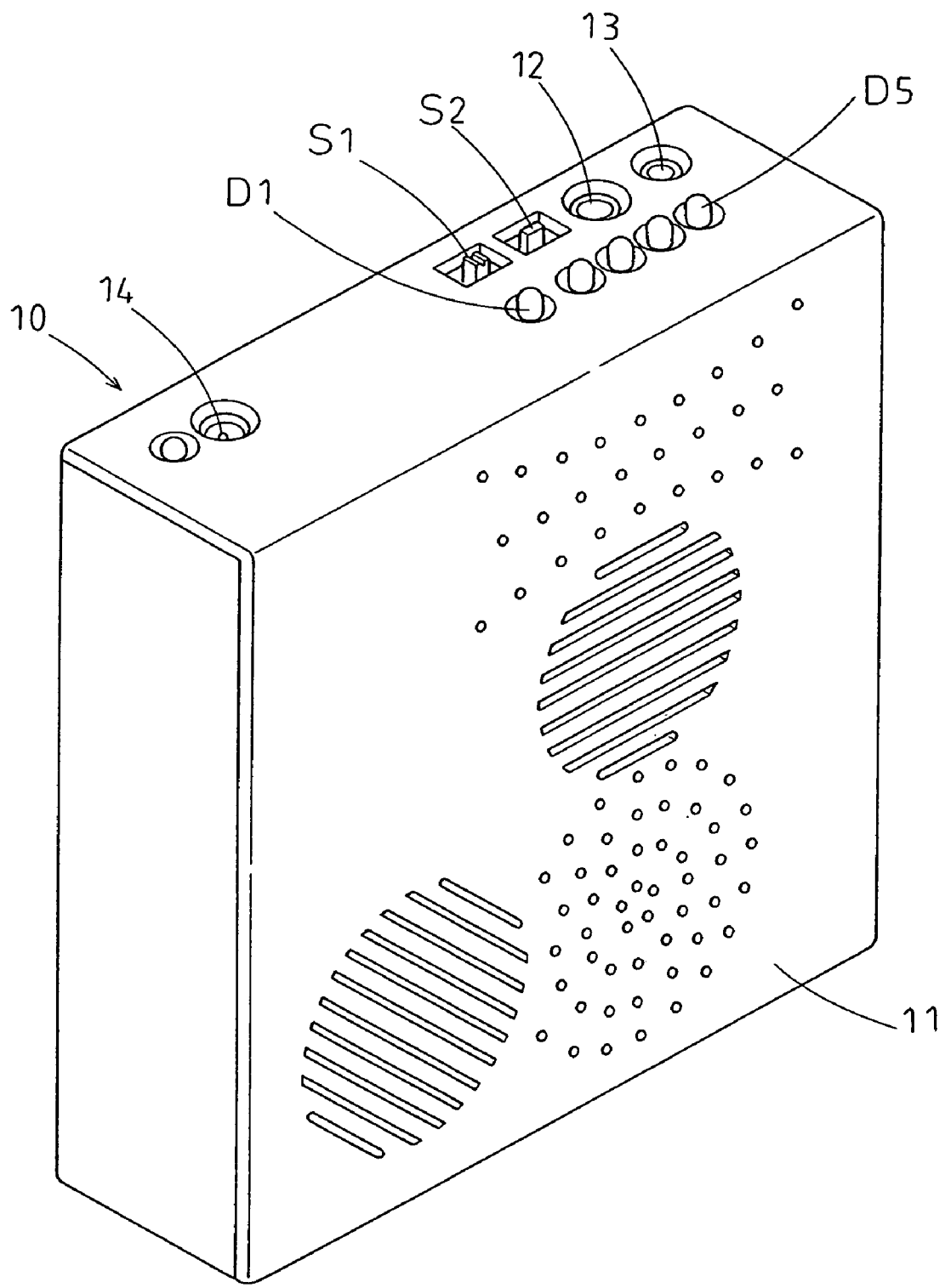
FIG. 1 is a perspective view of a controller for an electric article for human body in accordance with the present invention.

Referring to FIG. 1, a controller in accordance with the present invention is used with an electric article for human body, such as electric clothing, an electric blanket, an electric band for medical treatment or healthy maintenance, etc. Such an electric article includes a heating member (such as a thermally and electrically conductive carbon fiber) and a temperature-detecting wire.

Figure 2:
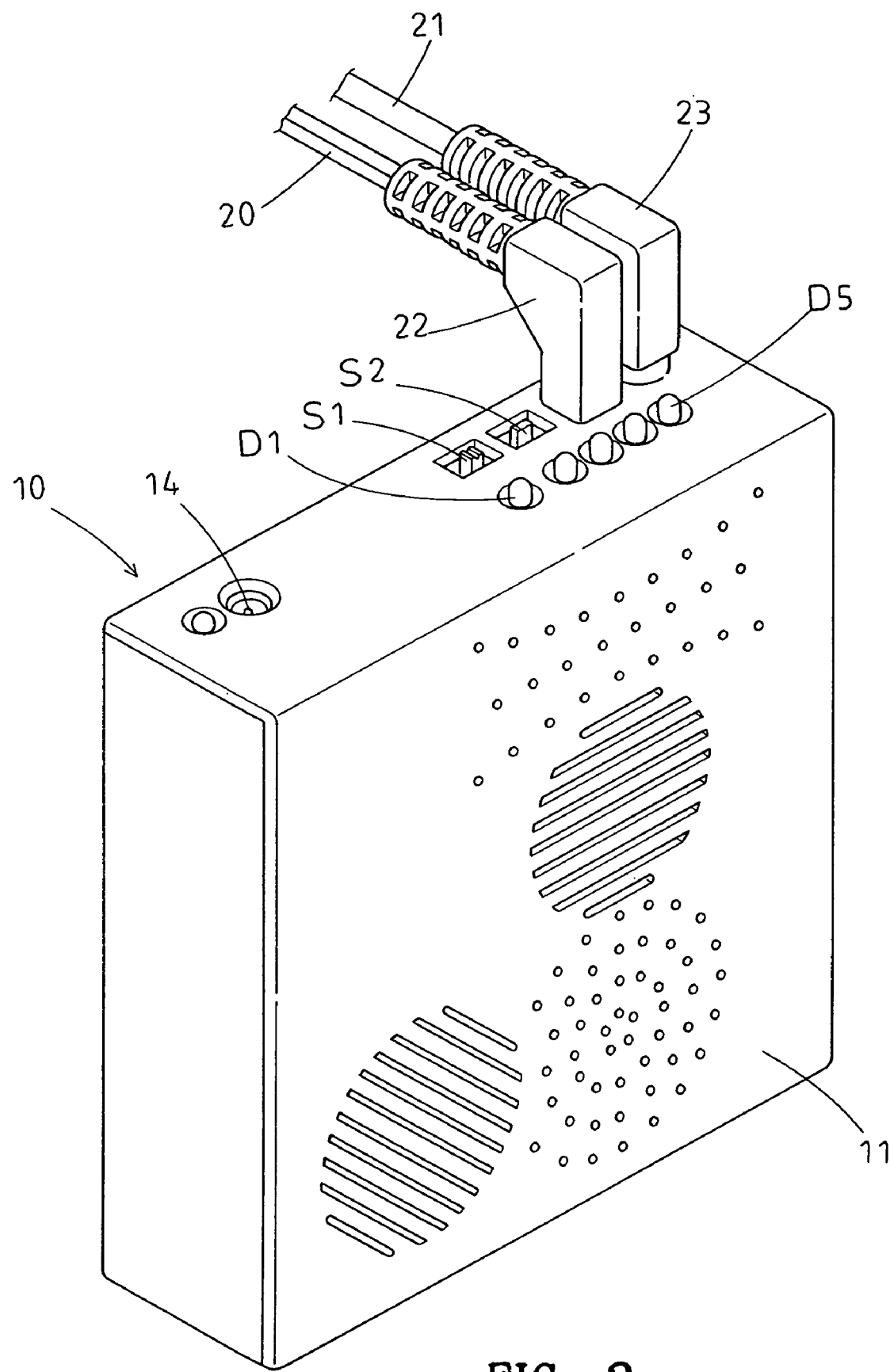
FIG. 2 is a perspective view similar to FIG. 1, illustrating use of the controller.

Referring to FIGS. 1 and 2, the controller 10 comprises a casing 11 including a power socket 12 for coupling with a coupler 22 on an end of a power cord 20 connected to a heating member (not shown) of an electric article (not shown), a temperature-detecting socket 13 for coupling with a coupler 23 on an end of a temperature-detecting wire 21 of the heating member, and a charging socket 14 for coupling with an external power source for charging purposes. The casing 11 further includes a power switch S1, a power indicator lamp D1, a temperature range switch S2 (such as a cyclic switch), and a plurality of temperature range indicator lamps D2, D3, D4, and D5 corresponding to several temperature ranges controlled by the temperature range switch S2.

The controller 10 controls DC power supplied to the heating member of the electric article for heating purposes. The controller 10 comprises a voltage-stabilizing circuit, a microprocessor U2, a temperature-detecting circuit, a protecting circuit, a control circuit, and a switch circuit. The controller 10 precisely detects the heating temperature and automatically maintains the heating temperature in the set range. Thus, the controller 10 is suitable for DC voltage output to voltage-drop-free control while providing a double protection design and enhanced operating safety.

Figure 3:
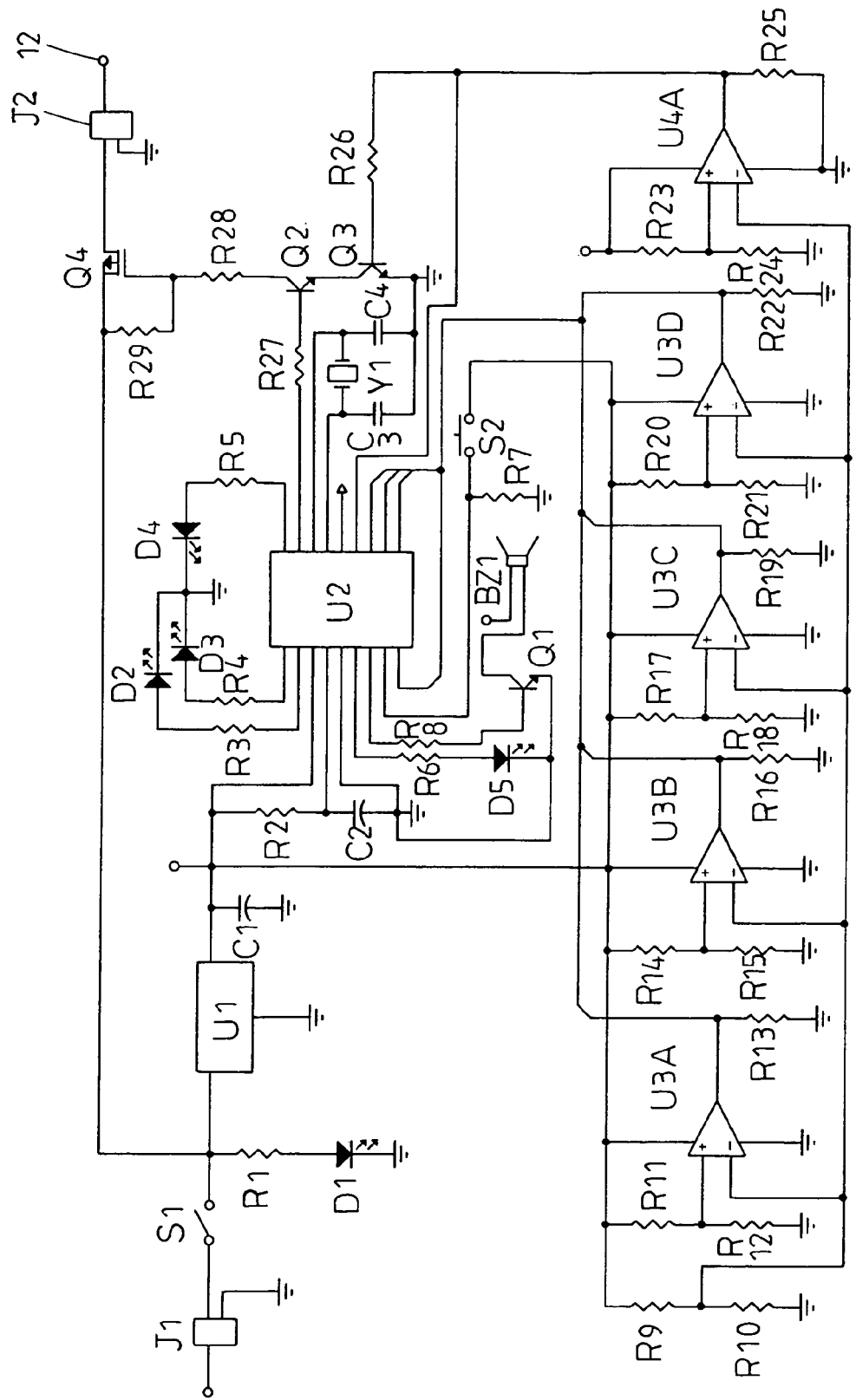
FIG. 3 is a circuitry diagram of the controller in accordance with the present invention.

Referring to FIGS. 1 and 3, the controller 10 comprises a DC power source (such as a battery) that outputs voltage stable DC power after passing through a coupler J1, the power switch S1, and a voltage-stabilizing element U1 of the voltage-stabilizing circuit. The DC power source is connected to the power indicator lamp D1 and a buffering resistor R1. An output of the stabilizing circuit branches to a filtering capacitor C1 for supplying DC voltage stable power to the microprocessor U2, the temperature-detecting circuit, and the protecting circuit.

The output of the voltage-stabilizing circuit includes a resistor R2 and a capacitor C2 that form an integrating circuit for resetting the microprocessor U2. The microprocessor U2 is connected to the temperature range switch S2 and a resistor R7 and then connected to the temperature range indicator lamps D2, D3, D4, and D5 via resistors R3, R4, R5, and R6 respectively. Further, the microprocessor U2 is connected via a resistor R8 and a transistor Q1 to a buzzer BZ1. Further, the microprocessor U2 is connected to a clock pulse oscillating circuit including two capacitors C3 and C4 and a quartz oscillating element Y1.

The voltage-stabilizing circuit supplies voltage stable DC power to the temperature-detecting circuit. The temperature-detecting circuit includes first, second, third, and fourth comparators U3A, U3B, U3C, and U3D for detecting four temperature ranges respectively. Each comparator U3A, U3B, U3C, U3D includes a negative input connected to a voltage-dividing end of a thermistor R9 and a resistor R10 that are connected to the temperature-detecting wire 21 (see FIG. 2). The positive inputs of the comparators U3A, U3B, U3C, U3D are respectively connected to resistors R11 and R12, R14 and R15, R17 and R18, and R20 and R21 of the respective voltage-dividing circuits of the voltage stable power. The comparators U3A, U3B, U3C, U3D are commonly connected to the temperature range switch S2. Further, the output of each comparator U3A, U3B, U3C, U3D is connected to the microprocessor U2. Further, the outputs of the comparators U3A, U3B, U3C, U3D are respectively grounded via resistors R13, R16, R19, and R22.

The protecting circuit includes a comparator U4A for detecting the highest heating temperature threshold. A positive input of the comparator U4A is connected to resistors R23 and R24 of another voltage-dividing circuit of the voltage stable power. A negative input of the comparator U4A is connected to the voltage-dividing end of the thermistor R9. An output of the comparator U4A is connected to the microprocessor U2 and branches to a grounding resistor R25.

The control circuit includes two transistor Q2 and Q3 that are connected in series. The base of the transistor Q2 is connected via a resistor R27 to #17 pin of the output of the microprocessor U2. The base of the transistor Q3 is connected via a resistor R26 to the output of the comparator U4A of the protecting circuit.

The switch circuit is connected between the DC power source and the power socket 12 of the output end coupler J2. Further, the switch circuit is connected to the transistor Q2 of the control circuit for controlling conduction or cutting off DC power supply to the electric article and the power socket 12. In a preferred embodiment, the switch circuit includes a metal-oxide-semiconductor field-effect transistor (MOSFET) Q4. The resistors R28 and 29 of the voltage-dividing circuit are connected between a gate of the transistor Q4 and the control circuit.

In use, the power switch S1 is turned on and the indicator lamp D1 lights. The microprocessor U2 is on standby. The indicator lamp D2 is turned on and the buzzer BZ1 beeps one time when the temperature range switch S2 is pressed once. Both the #17 pin of the microprocessor U2 and the comparator U4A of the protecting circuit output a high potential to make the transistor Q2 and Q3 conductive, and the resistors R28 and R29 create voltage division to make the MOSFET Q4 and the power socket 12 conductive, which is suitable for DC voltage output to voltage-drop-free control. The heating member of the electric article begins to generate heat.

The resistance of the thermistor R9 decreases when the temperature of the thermistor R9 rises, resulting in an increase in the voltage at the voltage-dividing end. When heating to the first temperature threshold (such as 45▫), the voltage at the negative input of the first comparator U3A is larger than that at the positive input of the first comparator U3A. Hence, the first comparator U3A outputs a low potential, which causes the #17 pin of the microprocessor U2 to output a low potential. Thus, the transistor Q2 and MOSFET Q4 become non-conductive and the DC power is cut off. Heating is stopped and the indicator lamp D2 is turned off. After automatic countdown of 10 seconds by the software of the microprocessor U2 cooperating with the clock pulse oscillating circuit and the clock pulse oscillating signal of the quartz oscillating element Y1, automatic heating begins. The above movements are repeated.

Another pressing of the temperature range switch S2 turns on the indicator lamps D2 and D3 and the buzzer BZ1 beeps again. The MOSFET Q4 becomes conductive for the DC power source, keeping on heating the heating member. When a second temperature threshold is reached, (such as 50▫), the voltage at the negative input of the second comparator U3B is larger than that at the positive input of the second comparator U3B. Hence, the second comparator U3B outputs a low potential to control the MOSFET Q4 via the microprocessor U2 and the transistor Q2 for the purposes of cutting off the DC power supply. Heating is stopped and the indicator lamps D2 and D3 are turned off. When the temperature drops below the first temperature threshold (45▫), automatic heating begins. The above movements are repeated.

Another pressing of the temperature range switch S2 turns on the indicator lamps D2, D3, and D4 and the buzzer BZ1 beeps again. The MOSFET Q4 becomes conductive for the DC power source, keeping on heating the heating member. When a third temperature threshold is reached, (such as 55▫), the voltage at the negative input of the third comparator U3C is larger than that at the positive input of the third comparator U3C. Hence, the third comparator U3C outputs a low potential to control the MOSFET Q4 via the microprocessor U2 and the transistor Q2 for the purposes of cutting off the DC power supply. Heating is stopped and the indicator lamps D2, D3, and D4 are turned off. When the temperature drops below the second temperature threshold (50▫), automatic heating begins. The above movements are repeated.

Another pressing of the temperature range switch S2 turns on the indicator lamps D2, D3, D4, and D5 and the buzzer BZ1 beeps again. The MOSFET Q4 becomes conductive for the DC power source, keeping on heating the heating member. When a fourth temperature threshold is reached, (such as 60▫), the voltage at the negative input of the fourth comparator U3D is larger than that at the positive input of the fourth comparator U3D. Hence, the fourth comparator U3D outputs a low potential to control the MOSFET Q4 via the microprocessor U2 and the transistor Q2 for the purposes of cutting off the DC power supply. Heating is stopped and the indicator lamps D2, D3, D4, and D5 are turned off. When the temperature drops below the third temperature threshold (55□), automatic heating begins. The above movements are repeated.

When the #17 pin of the microprocessor outputs a high potential and automatic countdown of 10 minutes is carried out by the software cooperating with the clock pulse oscillating circuit, it is determined that abnormal detection of the temperature-detecting wire 21 exists if the pre-set temperature is not reached. Namely, undesired disconnection or breakage of the temperature-detecting wire 21 occurs. In response, the microprocessor U2 immediately outputs a low potential to control the MOSFET Q4 via the transistor Q2 for the purposes of cutting off the DC power supply. Meanwhile, the buzzer BZ1 beeps to give a siren and the indicator lamps D2, D3, D4, and D5 are turned off to indicate abnormality in the heating control. Besides, during use, the #17 pin outputs a low potential to stop heating when the microprocessor U2 malfunctions.

In a case that the microprocessor U2 is broken, if the #17 pin keeps outputting high potential and if the automatic countdown fails, the temperature keeps on rising. When the temperature is above the highest threshold (such as 70□), the comparator U4A of the protecting circuit outputs a low potential to make the transistor Q3 non-conductive. Hence, the MOSFET Q4 cuts off the DC power, providing double protection.

The controller in accordance with the present invention is capable of precisely detecting the heating temperature, maintaining the heating temperature range with automatic control, and saving electricity, which is suitable for DC voltage output to voltage-drop-free control while providing a double protection design and enhanced operating safety to avoid risk of abnormal heating.

Although a specific embodiment has been illustrated and described, numerous modifications and variations are still possible without departing from the invention. The scope of the invention is limited by the accompanying claims.

What is claimed is:

1. A controller for an electric article for human body, the controller controlling DC power supply to an electrically conductive heat-generating member in the electric article and being connected to a temperature-detecting wire of the electric article, the controller comprising:

a voltage-stabilizing circuit for supplying voltage stable DC power;

a microprocessor;

a temperature-detecting circuit including a plurality of first comparators for detecting a plurality of temperature ranges, each said first comparator including a positive input connected to an associated one of a plurality of first voltage-dividing circuits of the voltage stable DC power, each said first comparator further including a negative input connected to a voltage-dividing end of a thermistor that is connected to the temperature-detecting wire, the first comparators being commonly connected to a temperature range switch;

a protecting circuit including a second comparator for detecting a pre-set highest heating temperature, the second comparator being connected to the voltage stable DC power and a second voltage-detecting circuit of the voltage stable DC power, the second comparator further being connected to the voltage-dividing end of the thermistor;

a control circuit connected to the microprocessor and an output of the second comparator of the protecting circuit; and a switch circuit connected to an output of the voltage stable DC power and the control circuit, thereby controlling conduction or cutting off DC power supply to the electric article, wherein the microprocessor includes software cooperating with a clock pulse oscillating circuit to provide a countdown for abnormal heating for cutting off DC power supply via the control circuit and the switch circuit.

2. The controller as claimed in claim 1 wherein the microprocessor further includes a plurality of indicator lamps connected to and controlled by the temperature range switch and the first comparators.

3. The controller as claimed in claim 1 wherein the microprocessor further includes a buzzer that beeps when temperature-range is switched or abnormal heating occurs.

4. The controller as claimed in claim 1 wherein the control circuit includes two transistors connected in series, the transistors being respectively connected to the output of the microprocessor and the output of the second comparator of the protecting circuit.

5. The controller as claimed in claim 1 wherein the switch circuit includes a metal-oxide-semiconductor field-effect transistor having a gate, further including a third voltage-dividing circuit between the gate of the metal-oxide-semiconductor field-effect transistor and the control circuit.

6. A controller for an electric article for human body, the controller controlling DC power supply to an electrically conductive heat-generating member in the electric article and being connected to a temperature-detecting wire of the electric article, the controller comprising:

a voltage-stabilizing circuit for supplying voltage stable DC power;

a microprocessor;

a temperature-detecting circuit including a plurality of first comparators for detecting a plurality of temperature ranges, each said first comparator including a positive input connected to an associated one of a plurality of first voltage-dividing circuits of the voltage stable DC power, each said first comparator further including a negative input connected to a voltage-dividing end of a thermistor that is connected to the temperature-detecting wire, the first comparators being commonly connected to a temperature range switch;

a protecting circuit including a second comparator for detecting a pre-set highest heating temperature, the second comparator being connected to the voltage stable DC power and a second voltage-detecting circuit of the voltage stable DC power, the second comparator further being connected to the voltage-dividing end of the thermistor;

a control circuit connected to the microprocessor and an output of the second comparator of the protecting circuit; and a switch circuit connected to an output of the voltage stable DC power and the control circuit, thereby controlling conduction or cutting off DC power supply to the electric article, wherein the microprocessor includes software cooperating with a clock pulse oscillating circuit to set a period of time before carrying out repeated heating for a lowest temperature range after cutting off the DC power supply.

* * * * *